United States Patent Office 3,553,331
Patented Jan. 5, 1971

3,553,331
PHARMACEUTICAL COMPOSITIONS AND METHODS UTILIZING 4-ALKYL-1,4-DIMETHYLCYCLOHEXYLAMINES AND 4-ALKYL-1,4-DIMETHYLCYCLOHEXANEMETHYLAMINES
Marvin Paulshock, Wilmington, Del., assignor to E. I. du Pont de Nemours and Company, Wilmington, Del., a corporation of Delaware
No Drawing. Continuation-in-part of application Ser. No. 700,705, Jan. 26, 1968, which is a continuation-in-part of application Ser. No. 370,373, May 26, 1964, now Patent No. 3,392,198. This application Feb. 28, 1969, Ser. No. 803,408
Int. Cl. A61k 27/00
U.S. Cl. 424—325
32 Claims

ABSTRACT OF THE DISCLOSURE

This invention relates to pharmaceutical compositions containing a compound of class of 4-alkyl-1,4-dimethylcyclohexylamines and 4-alkyl-1,4-dimethylcyclohexanemethylamines and to the use of such compositions to control influenza infections in warm-blooded animals. Typical compounds useful in these compositions and methods are 1,4,4-trimethylcyclohexylamine, N,N,1,4,4-pentamethylcyclohexanemethylamine, N,α,α,1,4,4 - hexamethylcyclohexanemethylamine and the hydrochloride salts of the foregoing named compounds.

CROSS REFERENCE TO RELATED APPLICATIONS

This application is a continuation-in-part of my copending application Ser. No. 700,705, filed Jan. 26, 1968, now abandoned, which in turn is a continuation-in-part of my application Ser. No. 370,373, filed May 26, 1964, and issued July 9, 1968 as Pat. No. 3,392,198.

SUMMARY OF THE INVENTION

This invention is directed to pharmaceutical compositions comprising a pharmaceutical carrier and a compound of the formula (I)

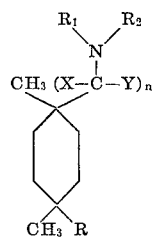

wherein R is methyl, ethyl, propyl or isopropyl; X and Y are hydrogen, methyl or ethyl; $n$ is 0 or 1; $R_1$ is hydrogen, alkyl of 1 through 4 carbon atoms, alkenyl of 3 through 4 carbon atoms with the unsaturated bonding in other than the 1-position and alkynyl of 3 through 4 carbon atoms with the unsaturated bonding in other than the 1-position; and $R_2$ is $R_1$ or formyl; and pharmaceutically acceptable acid-addition salts of said compounds.

This invention is also directed to a method of controlling influenza infection in a warm-blooded animal comprising administering to said animal an antiinfluenza effective amount of a compound of Formula I.

It will be understood that the use, in the above-described compositions and methods, of a compound hydrolyzable in vivo to a compound of Formula I is contemplated as being within the scope of this invention since for most purposes the two will be equivalent. It will also be understood that "pharmaceutically acceptable acid-addition salts" refers to acid-addition salts having a non-toxic anion. Representative of such salts are hydrochlorides, hydrobromides, sulfates, phosphates, nitrates, acetates, succinates, adipates, propionates, tartrates, citrates, bicarbonates, pamoates, cyclohexylsulfamates and acetylsalicylates. Of these, the hydrochlorides, acetates and cyclohexylsulfamates are preferred. The cyclohexylsulfamates have a pleasant taste and are therefore particularly useful in preparing syrups and uncoated tablets for oral administration. It wil be further understood that compounds of Formula I wherein R is other than methyl can exist as cis isomers, trans isomers and mixtures of the two.

DETAILED DESCRIPTION OF THE INVENTION

This invention is founded on the discovery that compounds of Formula I are useful as antiviral agents. These compounds possess the ability to inhibit and deter the incidence and growth of harmful viruses. An unusually high anti-influenza potency and favorable therapeutic ratio have been noted in animal tests. For example, in vivo tests in mice have demonstrated such activity against influenza viruses such as A/swine/S15, A1/FM–1/47 and A2/AA/2/60. Additionally, it has been found that compounds of Formula I exhibit significant stimulant activity.

Within the overall scope of the compounds of Formula I, various subclasses of compounds are found to provide particularly useful combinations of properties. For example, by proper selection of compounds, it is found that it is possible to attain different desired balances of stimulant and antiinfluenza activities as well as different desired balances of drug dynamics and antiinfluenza activities depending upon the type of diseases and patient being treated. More specifically, it has been found that compounds of Formula I wherein $R_1$ and $R_2$ are alkyls provide a balance of antiinfluenza activity with reduced stimulant activity. Compounds where either or both $R_1$ and $R_2$ is allyl offer good activity against rhinovirus. Compounds where $n$ is 1 also offer good antiinfluenza activity combined with reduced stimulant activity. Thus, where stimulation must be suppressed to the utmost, compounds wherein $R_1$ and $R_2$ are alkyls and $n$ is 1 are preferred. From the standpoint of favorable drug dynamics, chiefly longer acting prior to degradation or excretion, the compounds wherein $n$ is 1 and X and Y are methyl or ethyl are preferred. Preferred for potency of antiinfluenza activity are those compounds wherein R is methyl. 1,4,4-trimethylcyclohexylamine is particularly preferred because of its outstanding antiinfluenza activity and economy of manufacture.

In view of the foregoing considerations, preferred compounds of the invention for pharmaceutical application are the following:

1,4,4-trimethylcyclohexylamine hydrochloride
N,1,4,4-tetramethylcyclohexylamine hydrochloride
N-allyl-1,4,4-trimethylcyclohexylmethylamine hydrochloride
N,N,1,4,4-pentamethylcyclohexylamine hydrochloride
1,4,4-trimethylcyclohexanemethylamine hydrochloride
N-allyl-N,4,4-trimethylcyclohexylmethylamine hydrochloride
N,1,4,4-tetramethylcyclohexanemethylamine hydrochloride
N,N,1,4,4-pentamethylcyclohexanemethylamine
4-ethyl-1,4-dimethylcyclohexylamine hydrochloride
4-ethyl-N,1,4-trimethylcyclohexylamine hydrochloride
4-ethyl-N,N,1,4-tetramethylcyclohexylamine hydrochloride
α,1,4,4-tetramethylcyclohexanemethylamine hydrochloride
α,α,1,4,4-pentamethylcyclohexanemethylamine hydrochloride
N,N,α,1,4,4-hexamethylcyclohexanemethylamine hydrochloride
N,N,α,α,1,4,4-heptamethylcyclohexanemethylamine hydrochloride.

Thus, the preferred compounds of Formula I are those wherein $n$ is 0 or 1, X is methyl, Y is hydrogen or methyl, $R_1$ and $R_2$ are each hydrogen, methyl or allyl and R is methyl or ethyl when $n$ is 0 and R is methyl when $n$ is 1.

Illustrative of other compounds useful in the compositions and methods of this invention are the following amines and their salts:

1,4,4-trimethylcyclohexylamine
N,1,4,4-tetramethylcyclohexylamine
N,N,1,4,4-pentamethylcyclohexylamine
1,4,4-trimethylcyclohexanemethylamine
N,1,4,4-tetramethylcyclohexanemethylamine
N,N,1,4,4-pentamethylcyclohexanemethylamine
α,1,4,4-tetramethylcyclohexanemethylamine
N,α,1,4,4-pentamethylcyclohexanemethylamine
N,N,α,1,4,4-hexamethylcyclohexanemethylamine
α,α,1,4,4-pentamethylcyclohexanemethylamine
N,α,α,1,4,4-hexamethylcyclohexanemethylamine
N,N,α,α,1,4,4-heptamethylcyclohexanemethylamine
4-ethyl-1,4-dimethylcyclohexylamine
4-isopropyl-1,4-dimethylcyclohexanemethylamine
4-propyl-α,1,4-trimethylcyclohexanemethylamine
α-ethyl-1,4,4-trimethylcyclohexanemethylamine
α,4-diethyl-α,1,4-trimethylcyclohexanemethylamine
α,α,4-triethyl-1,4-dimethylcyclohexanemethylamine
N-ethyl-1,4,4-trimethylcyclohexylamine
N-propyl-1,4,4-trimethylcyclohexanemethylamine
4-ethyl-N-isopropyl-α,1,4-trimethylcyclohexamethylamine
N-butyl-α,α,1,4,4-pentamethylcyclohexanemethylamine
N-sec-butyl-1,4,4-trimethylcyclohexylamine
N-ethyl-N,1,4,4-tetramethylcyclohexylamine
N,N-dibutyl-4-propyl-α,α-diethyl-1,4-dimethylcyclohexanemethylamine
N-allyl-1,4,4-trimethylcyclohexylamine
N-(2-butenyl)-N,1,4,4-tetramethylcyclohexylamine
N-propargyl-4-propyl-1,4-dimethylcyclohexanemethylamine
N-(3-butynyl)-α,N,1,4,4-pentamethylcyclohexanemethylamine
N-formyl-1,4,4-trimethylcyclohexylamine
N-formyl-4-ethyl-1,4-dimethylcyclohexylamine
N-formyl-4-isopropyl-1,4-dimethylcyclohexylamine
N-formyl-4-propyl-1,4-dimethylcyclohexylamine
N-formyl-1,4,4-trimethylcyclohexanemethylamine
N-formyl-4-ethyl-1,4-dimethylcyclohexanemethylamine
N-formyl-α,1,4,4-tetramethylcyclohexanemethylamine
N-formyl-α,4-diethyl-α,1,4-trimethylcyclohexanemethylamine.

The compounds of the invention can be prepared by a variety of methods such as will be obvious from the following discussion. To synthesize 4-alkyl-1,4-dimethylcyclohexylamines, one subjects a 4-alkyl-1,4-dimethylcyclohexanol to the Ritter reaction, using acetonitrile and sulfuric acid or hydrogen cyanide and sulfuric acid to yield the N-acetyl or N-formyl-4-alkyl-1,4-dimethylcyclohexylamine. The acetyl or formyl group is removed by alkaline hydrolysis to yield the 4-alkyl-1,4-dimethylcyclohexylamine.

For the synthesis of 4-alkyl-1,4-dimethylcyclohexanemethylamines, one first converts a 4-alkyl-1,4-dimethylcyclohexanol to the 4-alkyl-1,4-dimethylcyclohexanecarboxylic acid by the action of formic acid and sulfuric acid, then converts the carboxylic acid to the acid chloride with thionyl chloride or phosphorus pentachloride and prepares the carboxamide by reaction with ammonia. Reduction of the 4-alkyl-1,4-dimethylcyclohexane carboxamide with lithium aluminum hydride or by catalytic reduction yields the 4-alkyl-1,4-dimethylcyclohexanemethylamine.

In preparing α-alkyl-4-alkyl-1,4-dimethylcyclohexanemethylamines one converts a 4-alkyl-1,4-dimethylcyclohexanecarboxylic acid chloride to a 4-alkyl-1,4-dimethylcyclohexyl-(1) alkyl ketone by the action of ethoxymagnesium diethylmalonate or a dialkyl cadmium. The ketone is converted to the oxime, and the oxime is reduced catalytically or with lithium aluminum hydride to give the α-alkyl-4-alkyl-1,4-dimethylcyclohexanemethylamine.

The 4-alkyl-1,4-dimethylcyclohexyl-(1) alkyl ketones are used as starting materials for preparation of α-alkyl-α-alkyl-4-alkyl-1,4-dimethylcyclohexanemethylamines. By the action of the appropriate alkyl Grignard reagent, the ketone is converted to an α-alkyl-α-alkyl-4-alkyl-1,4-dimethylcyclohexanemethanol. A Ritter reaction on this compound produces an N-acetyl or N-formyl-α-alkyl-α-alkyl-4-alkyl-1,4-dimethylcyclohexanemethylamine, from which the α-alkyl-α-alkyl-4-alkyl-1,4-dimethylcyclohexanemethylamine is liberated by alkaline hydrolysis. It is evident that different α-alkyl groups can be introduced by this synthesis.

The cyclohexylamines and cyclohexanemethylamines of this invention can be N-alkylated by acylation and reduction. That is, the primary amine can be acylated with an acid chloride, acid anhydride or ester to give the N-acyl compound, which is reduced with lithium aluminum hydride or by catalytic hydrogenation to give the N-alkyl compound. For example, reaction of butyryl chloride in pyridine with 1,4,4-trimethylcyclohexylamine yields N-butyryl-1,4,4-trimethylcyclohexylamine. Lithium aluminum hydride reduction of this compound yields N-butyl-1,4,4-trimethylcyclohexylamine. Reduction of intermediates from the Ritter reaction yield N-ethyl and N-methyl amines.

N-alkylamines can be acylated again and reduced to yield N,N-dialkylamines. Thus, N,N-dialkylamines having different alkyl groups can be prepared by the use of different acylating agents, or N,N-dialkylamines having like alkyl groups can be prepared by using the same acylating agent for the first and second acylations.

While reduction of an N-formylamine from the Ritter reaction (or made by formylation of the primary amine with butyl formate, for example) followed by another formylation and reduction is a perfectly practical method for obtaining the N,N-dimethylamine compound, it is easier to use the Eschweiler-Clarke reaction of formic acid and formaldehyde with the primary amine to obtain the N,N-dimethylamine. In fact, where one of the alkyl groups of an N,N-dialkylamine is methyl, it is easiest to introduce the nonmethyl alkyl group by acylation and reduction and then to treat this with formic acid and formaldehyde to obtain the N-alkyl-N-methylamine.

In preparing N-alkyl and N,N-dialkyl-4-alkyl-1,4-dimethylcyclohexanemethylamines, it is not necessary to prepare the primary amine and then alkylate it in subsequent steps. If an alkylamine or dialkylamine is used instead of ammonia in the reaction of 4-alkyl-1,4-dimethylcyclohexanecarboxylic acid chlorides to form the carboxamides, N-alkyl or N,N-dialkyl-4-alkyl-1,4-dimethylcyclohexanecarboxamides are formed, which, when reduced, yield N-alkyl and N,N-dialkyl-4-alkyl-1,4-dimethylcyclohexanemethylamines directly. If the carboxamide having mixed N,N-dialkyl groups is prepared by using a dialkylamine having different alkyl groups, a N,N-dialkylcyclohexanemethylamine having different N-alkyl groups is obtained.

N-alkenyl and N-alkynyl groups are best introduced onto a primary amine or N-substituted amine by using an alkenyl or alkynyl halide and an acid acceptor such as sodium bicarbonate. When equimolar quantities of a primary amine and halide are used, the major product is the N-alkenyl or N-alkynylamine, but usually some of the N,N-dialkenyl or N,N-dialkynylamine is formed as a by-product. The two can usually be separated by distillation. If an N-alkyl-N-alkenyl or N-alkyl-N-alkynylamine is desired, one starts with the N-alkylamine and introduces the alkenyl or alkynyl group, again using an equimolar amount of the halide. Excess halide should be avoided. In the reactions of primary amines excess halide leads to di-alkenylation or di-alkynylation. With secondary amines it leads to quaternization, decreasing the yield of the desired product.

Salts of the amines of this invention can be prepared in a number of ways. Generally, the amine is contacted with the acid in water or in an organic solvent. In some instances, the salt is insoluble, and is filtered and dried. For example, most of the hydrochlorides of amines of this invention are insoluble in ether. Solvents such as alcohol and water, in which the amine salts are generally soluble, can be used just as well. After the amine and the acid have been combined, the solvent is removed by evaporation.

Because solubility of the salt in water depends to an extent on the acid anion, many salts are in fact insoluble in water and alcohols. Pamoates, for example, are usually quite water-insoluble and separate from aqueous mixtures almost quantitatively.

Detailed working examples showing the preparation of many of the above-mentioned compounds and other compounds useful in the methods and compositions for this invention are provided in my application Ser. No. 370,372, filed May 26, 1964, now Pat. No. 3,392,198. This disclosure and all other disclosures of said copending application not expressly set forth herein are hereby incorporated by reference for a more complete understanding of the invention.

The compounds of Formula I can be administered in the antiinfluenza treatment according to this invention by any means that effects contact thereof with the site of influenza virus infection in the body of a warm-blooded animal. It will be understood that this includes the site prior to infection setting in as well as after. For example, administration can be parenterally, that is subcutaneously, intravenously, intramuscularly or intraperitoneally. Alternatively or concurrently, the compounds are effective on administration by the oral route. Since these compounds are particularly effective against respiratory infections such as viral influenza and viral pneumonia, administration can be by vapor or spray through the mouth or nasal passages. The compounds within the scope of this invention are valuable for influenza viral prophylaxis, as well as for therapeutic treatment.

The dosage administered will be dependent upon the influenza virus being treated, the age, health and weight of the recpient, the extent of infection, kind of concurrent treatment, if any, frequency of treatment, and the nature of the effect desired. Generally, a daily dosage of active ingredient compound will be from about 0.05 to 25 milligrams per kilogram of body weight, although lower or higher amounts can be used. Ordinarily, from about 0.1 to 10 milligrams per kilogram per day, in one or more applications per day, is effective to obtain the desired result.

As specific examples of treatment, the compounds shown in Table 1 below were each administered intraperitoneally to Swiss-Webster mice one-half hour prior to infection with a $20LD_{50}$ dose of influenza A/Swine/S15. An $LD_{50}$ dose is that dose which causes the death of 50% of a group of nontreated mice within the test period; in these experiments the test period was twelve days. The mean survivor day (MSD) for each group of mice receiving the same test compound was calculated as follows:

$$MSD = \frac{\Sigma[f(d-1)]}{N}$$

where $f$ is the number of mice reported dead on day $(d)$ and $N$ is the number of mice in the test group. From the MSD is calculated the $AVI_{50}$ which is the amount of test compound required to reduce the infection to a level equivalent to a reduction of one-half log of the virus inoculum. Stated differently, the $AVI_{50}$ is that dose, expressed in milligrams of test compound per kilogram of body weight, which causes an apparent 3.2-fold decrease in the infectivity of the virus.

TABLE 1

| Compound: | $AVI_{50}$ |
|---|---|
| 1,4,4-trimethylcyclohexylamine hydrochloride | 2.5 |
| N,1,4,4-tetramethylcyclohexylamine hydrochloride | 11 |
| N,N,1,4,4 - pentamethylcyclohexylamine hydrochloride | 5.5 |

As further specific examples of treatment, 1,4,4-trimethylcyclohexylamine hydrochloride was administered to Swiss-Webster mice by intraperitoneal injection every four hours from one-half hour prior to infection to 23½ hours post infection (seven doses). Each mouse was infected intranasally with a $20LD_{50}$ dose of influenza A1/FM–1/47 or influenza A2/AA/2/60. Each dose of 1,4,4-trimethylcyclohexylamine hydrochloride administered consisted of 7.5 mg./kg. of body weight. The mortality of the treated and control mice was determined seven days after infection. Of the seven treated mice infected with influenza A1/FM–1/47 there were five survivors, whereas of the twenty-eight nontreated, control mice there were only two survivors. Likewise, of the seven treated mice infected with influenza A2/AA/2/60, there were five survivors and only two survivors in the control group of twenty-eight mice.

The active ingredients of Formula I can be employed in useful compositions according to the present invention in such dosage forms as tablets, capsules, powder packets, or liquid solutions, suspensions or elixirs, for oral administration, or liquid solutions for parenteral use, and in certain cases, suspensions for parenteral use (except intravenous). In such compositions the active ingredient will ordinarily always be present in an amount of at least 0.1% by weight based on the total weight of the composition and not more than 95% by weight. Besides the active ingredient of Formula I the antiinfluenza composition will contain a solid or liquid nontoxic pharmaceutical carrier for the active ingredient.

In one embodiment of a pharmaceutical composition of this invention, the solid carrier is a capsule which can be of the ordinary gelatin type. In the capsule will be from about 30 to 60% by weight of a compound of Formula I and 70 to 40% of a carrier. In another embodiment, the active ingredient is tableted with or without adjuvants. In yet another embodiment, the active ingredient is put into powder packets and employed. These capsules, tablets and powders will generally constitute from about 5% to about 95%, and preferably from 25% to 90% by weight of carrier and from about 95% to about 5%, and preferably about 75% to about 10% by weight of active ingredient.

These dosage forms preferably contain from about 1 to about 500 milligrams of active ingredient.

The pharmaceutical carrier can, as previously indicated, by a sterile liquid such as water and oils, including those of petroleum, animal, vegetable or synthetic origin, for example, peanut oil, soybean oil, mineral oil and sesame oil. In general, water, saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.1 to 10%, and preferably about 0.4 to 5% by weight of the active ingredient.

As mentioned above, oral administration can be in a suitable suspension or syrup, in which the active ingredient ordinarily will constitute from about 0.05 to 10%, and preferably about 0.1 to 5%, by weight. The pharmaceutical carrier in such composition can be a watery vehicle such as an aromatic water, a syrup or a pharmaceutical mucilage.

Suitable pharmaceutical carriers are described in "Remington's Pharmaceutical Sciences" by E. W. Martin, a well-known reference text in this field.

In addition to the exemplary illustrations above, the following examples further explain the present invention:

EXAMPLE 1

A large number of unit capsules are prepared by filling standard #3 two-piece hard gelatin capsules weighing about 50 milligrams each with 10 milligrams of powdered 1,4,4-trimethylcyclohexylamine hydrochloride, 175 milligrams of lactose, 0.9 milligram of "Cab-O-Sil" (a pyrogenic silicon dioxide available from the G. L. Cabot Co.) and 1.75 milligrams of magnesium stearate.

EXAMPLE 2

Soft gelatin capsules are filled using powdered 1,4,4-trimethylcyclohexylamine dissolved in soya bean oil.

EXAMPLE 3

A large number of tablets are prepared using a conventional tableting machine. Each tablet contains about 10 milligrams of 1,4,4-trimethylcyclohexylamine hydrochloride, 4.0 milligrams of gelatin, 3.0 milligrams of magnesium stearate and 83 milligrams of mannitol. Slow release pills or tablets can also be prepared by applying appropriate coatings. A sugar or film coating may be applied to increase palatability.

EXAMPLE 4

A parenteral composition suitable for administration by injection is prepared by stirring 0.5% by weight of 1,4,4-trimethylcyclohexylamine hydrochloride into sodium chloride injection, USP. The resulting solution is sterilized according to accepted techniques.

EXAMPLE 5

Monolayers of HeLa-C cells grown to confluency in 100 mm. plastic tissue culture dishes by established methods are infected with about 200 plaque-forming units of rhinovirus 2/HGP. After a 90-minute adsorption period the virus suspension is removed and the monolayers covered with a 10 ml. volume of agar medium. When the agar layer is hardened, paper discs, 6.4 mm. in diameter, which are impregnated with varying amounts of N-allyl-1,4,4 - trimethylcyclohexylmethylamine hydrochloride (Compound I), are applied to the agar surface. These tissue culture dishes are incubated at 33° C. for six days. On the sixth day the agar layer is removed and the monolayer of virus-infected HeLa-C cells is stained with crystal violet. Where the virus has multiplied, the cell layer is seen to have holes (plaques) caused by cell destruction. However, in a zone around the paper disc the cells are free of plaques due to inhibition of virus growth caused by compound diffusing from the patch. Results are shown below:

| μcg. Compound I per disc— | Diameter of zone free of plaques (mm.) |
|---|---|
| 80 | No virus growth (no plaques). |
| 40 | 65 mm. |
| 20 | 30 mm. |
| 10 | Trace activity—zone not measurable. |
| 0 | Plaques uniformly distributed on cell monolayer. |

The compound diffusion from the disc prevents virus growth thus protects the cell from damage and Compound I is thus shown to have antiviral activity against rhinovirus 2/HGP.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin text mentioned above.

The compounds of Formula I are antiinfluenza agents in domestic animals and livestock. As an illustration, the compounds of Formula I are effective against swine influenza and an embodiment of this invention, therefore, is the control of this infection by incorporating an active ingredient in the diet of the animal. For most purposes, an amount of active compounds will be used to provide from about 0.0001% to 0.1%, and preferably from 0.001% to 0.02%, by weight of the active compound based on the total weight of feed intake.

Thus, novel and useful compositions are provided by this invention which comprise at least one active ingredient compound within the scope of this invention in admixture with an animal feed. Descriptions of suitable feeds can be found in the book "Feeds and Feeding" by Frank B. Morrison, published by the Morrison Publishing Company of Ithaca, New York, 1948, 21st edition. The selection of the particular feed is within the knowledge of the art and will depend of course, on the animal, the economics, natural materials available, the surrounding circumstances and the nature of the effect desired, as will be readily understood.

Particularly important composition according to this feature of the invention is a concentrate, suitable for preparation and sale to a farmer or livestock grower for addition to the animal's feedstuffs in appropriate proportion. These concentrates ordinarily comprise about 0.5% to about 95% by weight of the active compound together with a finely divided solid, preferably flours, such as wheat, corn, soya bean and cottonseed. Depending on the recipient animals, the solid adjuvant can be ground cereal, charcoal, fuller's earth, oyster shell and the like. Finely divided attapulgite and bentonite can be used, these latter materials also acting as solid dispersing agents.

The feed compositions, as well as the just described concentrates, can additionally contain other components of feed concentrates or animal feeds, as will be readily understood. Other particularly important additives include proteins, carbohydrates, fats, vitamins, minerals, antibiotics, etc.

The following example will further illustrate this aspect of this invention.

EXAMPLE 6

A feed for pigs is prepared as follows:

|  | Pounds |
|---|---|
| Oat groats | 350 |
| Yellow corn, ground | 1000 |
| Molasses | 100 |
| Soybean meal | 450 |
| Dried skim milk | 100 |
| Ground limestone | 20 |
| Dicalcium phosphate | 20 |
| Salt plus trace mineral mix | 10 |
| Standard vitamin premix | 1 |
| Total | 2051 |

There is added to the pigs' diet a concentration of 50% of 1,4,4-trimethylcylohexylamine hydrochloride as the active ingredient and 50% by weight corn flour, in an amount that provides 0.015% by weight of the active ingredient based on the total diet.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

What is claimed is:

1. A method of controlling influenza virus infection in a warm-blooded animal comprising administering to said animal an antiinfluenza effective amount of a compound of the formula

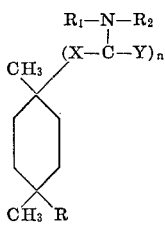

wherein R is methyl, ethyl, propyl or isopropyl; X and Y are hydrogen, methyl or ethyl; $n$ is 0 or 1; $R_1$ is hydrogen, alkyl of 1 through 4 carbon atoms, alkenyl of 3 through 4 carbon atoms with the unsaturated bonding in other than the 1-position or alkynyl of 3 through 4 carbon atoms with the unsaturated bonding in other than the 1-position; and $R_2$ is $R_1$ or formyl; and pharmaceutically acceptable acid-addition salts of said compounds.

2. The method of claim 1 wherein $n$ is 0 or 1, X is methyl, Y is hydrogen or methyl, $R_1$ and $R_2$ are each hydrogen, methyl or allyl and R is methyl or ethyl when $n$ is 0 and R is methyl when $n$ is 1.

3. The method of claim 1 wherein said compound is 1,4,4-trimethylcyclohexylamine hydrochloride.

4. The method of claim 1 wherein said compound is N,1,4,4-tetramethylcyclohexylamine hydrochloride.

5. The method of claim 1 wherein said compound is N,N,1,4,4-pentamethylcyclohexylamine hydrochloride.

6. The method of claim 1 wherein said compound is 1,4,4-trimethylcyclohexanemethylamine hydrochloride.

7. The method of claim 1 wherein said compound is N,1,4,4-tetramethylcyclohexanemethylamine hydrochloride.

8. The method of claim 1 wherein said compound is N,N,1,4,4-pentamethylcyclohexanemethylamine hydrochloride.

9. The method of claim 1 where said compound is 4-ethyl-1,4-dimethylcyclohexylamine hydrochloride.

10. The method of claim 1 wherein said compound is 4-ethyl-N,1,4-trimethylcyclohexylamine hydrochloride.

11. The method of claim 1 wherein said compound is 4-ethyl-N,N,1,4-tetramethylcyclohexylamine hydrochloride.

12. The method of claim 1 wherein said compound is $\alpha$,1,4,4-tetramethylcyclohexanemethylamine hydrochloride.

13. The method of claim 1 wherein said compound is $\alpha,\alpha$,1,4,4-pentamethylcyclohexanemethylamine hydrochloride.

14. The method of claim 1 wherein said compound is N,N,$\alpha$,1,4,4-hexamethylcyclohexanemethylamine hydrochloride.

15. The method of claim 1 wherein said compound is N,N,$\alpha,\alpha$,1,4,4-heptamethylcyclohexanemethylamine hydrochloride.

16. The method of claim 1 wherein said compound is N-allyl-1,4,4-trimethylcyclohexylmethylamine hydrochloride.

17. A pharmaceutical composition for control of influenza virus infection comprising a pharmaceutical carrier and an antiinfluenza effective amount of a compound of the formula

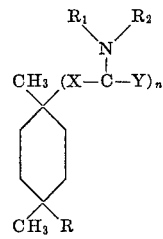

wherein R is methyl, ethyl, propyl or isopropyl; X and Y are hydrogen, methyl or ethyl; $n$ is 0 or 1; $R_1$ is hydrogen, alkyl of 1 through 4 carbon atoms, alkenyl of 3 through 4 carbon atoms with the unsaturated bonding in other than the 1-position or alkynyl of 3 through 4 carbon atoms with the unsaturated bonding in other than the 1-position; and $R_2$ is $R_1$ or formyl; and pharmaceutically acceptable acid-addition salts of said compounds.

18. The composition of claim 17 wherein $n$ is 0 or 1, X is methyl, Y is hydrogen or methyl, $R_1$ and $R_2$ are each hydrogen, methyl or allyl and R is methyl or ethyl when $n$ is 0 and R is methyl when $n$ is 1.

19. The composition of claim 17 wherein said compound is 1,4,4-trimethylcyclohexylamine hydrochloride.

20. The composition of claim 17 wherein said compound is N,1,4,4-tetramethylcyclohexylamine hydrochloride.

21. The composition of claim 17 wherein said compound is N,N,1,4,4-pentamethylcyclohexylamine hydrochloride.

22. The composition of claim 17 wherein said compound is 1,4,4-trimethylcyclohexanemethylamine hydrochloride.

23. The composition of claim 17 wherein said compound is N,1,4,4-tetramethylcyclohexanemethylamine hydrochloride.

24. The composition of claim 17 wherein said compound is N,N,1,4,4-pentamethylcyclohexanemethylamine hydrochloride.

25. The composition of claim 17 wherein said compound is 4-ethyl-1,4-dimethylcyclohexylamine hydrochloride.

26. The composition of claim 17 wherein said compound is 4-ethyl-N,1,4-trimethylcyclohexylamine hydrochloride.

27. The composition of claim 17 wherein said compound is 4-ethyl-N,N,1,4-tetramethylcyclohexylamine hydrochloride.

28. The composition of claim 17 wherein said compound is $\alpha$,1,4,4-tetramethylcyclohexanemethylamine hydrochloride.

29. The composition of claim 17 wherein said compound is $\alpha,\alpha$,1,4,4-pentamethylcyclohexanemethylamine hydrochloride.

30. The composition of claim 17 wherein said compound is N,N,α,1,4,4-hexamethylcyclohexanemethylamine hydrochloride.

31. The composition of claim 17 wherein said compound is N,N,α,α,1,4,4 - heptamethylcyclohexanemethylamine hydrochloride.

32. The composition of claim 17 wherein said compound is N-allyl - 1,4,4-trimethylcyclohexylmethylamine hydrochloride.

References Cited

Antibiotic News, vol. 5, No. 9, October 1968, pp. 1 and 3.

Andrewes, Viruses of Vertebrates, the Williams and Wilkins Co., Baltimore, Md., 1964, pp. 24–27, 171–180.

Nicolaides et al., Journal of Medicinal Chemistry, 11, pp. 74–79 (1968).

JEROME D. GOLDBERG, Primary Examiner